Dec. 19, 1950     L. LIBERTHSON     2,534,279
VAPOR DETECTING DEVICE FOR DETERMINING
PAINTABILITY OF MASONRY SURFACES
Filed July 26, 1947
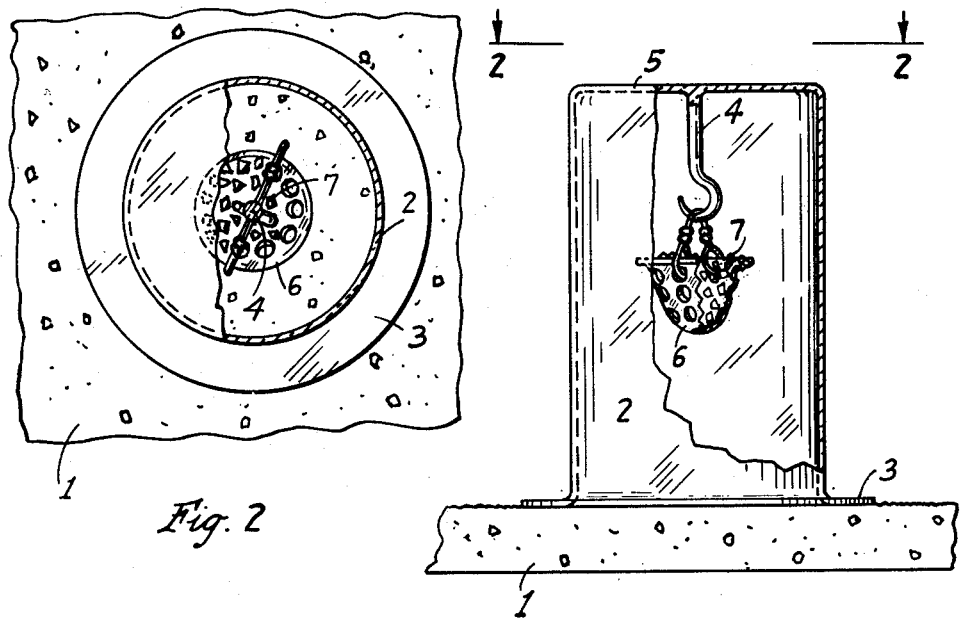
Fig. 2
Fig. 1
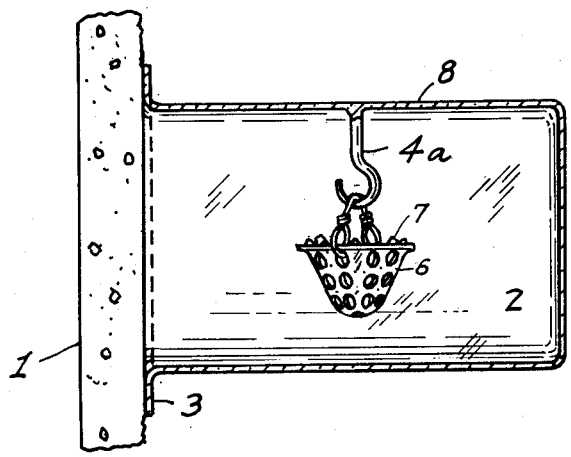
Fig. 3
INVENTOR
Leo Liberthson
BY
Burgess and Dinklage
ATTORNEY Patented Dec. 19, 1950

2,534,279

UNITED STATES PATENT OFFICE 2,534,279

VAPOR DETECTING DEVICE FOR DETERMINING PAINTABILITY OF MASONRY SURFACES

Leo Liberthson, New York, N. Y., assignor to L. Sonneborn Sons, Inc., a corporation of Delaware Application July 26, 1947, Serial No. 763,981

2 Claims. (Cl. 73—73)

1

This invention relates to new and useful improvements in device for determining the paintability of masonry surfaces.

In the painting of masonry surfaces it is a necessary prerequisite that the surface to be painted is substantially dry. Moisture within the masonry surface may be either due to absorbed moisture or may be due to the moisture produced as the result of the setting of particular masonry materials. It is in many cases difficult to ascertain whether or not a masonry surface is sufficiently dry to be safely painted. This is particularly true for recently constructed or repaired masonry surfaces since the moisture resulting from the setting process involved in many masonry materials is only relatively gradually produced and released. Often a masonry surface though seemingly dry will when painted show paint blisters due to the subsequent gradual evolution of moisture of setting.

One object of the instant invention comprises inter alia a device by which the relative dryness of a masonry surface and thus its paintability can be determined.

The foregoing and further objects of the invention will be apparent from the foregoing description read in connection with the drawings in which:

Fig. 1 is a side view partly in cross-section of one embodiment of a device in accordance with my invention;

Fig. 2 represents a top view of the construction shown in Fig. 1, and

Fig. 3 is a cross-sectional side view of an alternative embodiment of the device in accordance with the invention.

Referring to the drawings, 1 indicates a masonry surface such as stone, plaster, concrete, etc. Referring to Figs. 1 and 2, a substantially transparent container such as the beaker 2 having a contact-seal lip 3 is placed with the latter onto the masonry surface. The contact-seal lip may be of any suitable material capable of securing the beaker in substantially sealing relation to the masonry surface. Within the preferred embodiment of my invention, the contact-seal lip 3 is substantially flat and ground to a smooth finish on its underside. Further, it is recommended that a small amount of petrolatum or other suitable grease or similar compound adapted for sealing purposes be applied to the ground surface of the contact-sealing lip. The beaker itself is preferably in its entirety made of a transparent material such as glass, plastic or the like. A hook 4 is carried by the

2 beaker. If the beaker is one that is intended for use in connection with a substantially horizontal masonry surface as illustrated in Fig. 1, the hook is carried by what normally constitutes the bottom 5 of the beaker. There is suspended from the hook a perforated basket 6. Into the same may be placed a visual moisture indicator material such as the material 7. The indicator material may be for instance one of the cobalt salt type. The latter materials when substantially dry are of a relatively deep blue color which with the assimilation of water changes to pink, thus furnishing an indication of the presence of moisture. Other suitable indicator materials useful in accordance with the invention may be for instance the conventionally well known moisture indicator papers which also indicate the presence of moisture by a change in color. Strips of such paper can be suitably secured either directly to the hook or placed into the basket.

If a substantially vertical masonry surface is to be tested for paintability, the device may be modified as substantially shown in Fig. 3. The hook 4a is there carried by the side wall 8 of the beaker 3.

The invention thus broadly embraces a device for determining the paintability of masonry surfaces which comprises a substantially rigid open ended container having at least a portion of its exterior substantially transparent, means for securing said container to and with said open end against a masonry surface, and means within said container for securing a visual moisture indicator and viewable through said transparent portion.

In the practical application of the invention a beaker of the type herein described and having a basket filled with a material such as a dry cobalt salt is provided on the contact-sealing lip with some petrolatum and then simply pressed against the wall to be tested. If after a predetermined period such as for instance 12 to 24 hours the moisture indicator material has remained substantially unchanged the surface can be considered ready for painting. If on the other hand the moisture indicator material has changed color thus indicating moisture the surface is not ready for painting and the paintability determination by the use of the device in accordance with the invention must be repeated from time to time until no indicator color change takes place.

The amount of indicator material in relation to the internal size of the container is not critical since the capillary action of the masonry wall will continue to feed moisture from a considerable adjacent area. For this reason the device in accordance with the invention is a considerably accurate indicator of the moisture content of a relatively large area. It is recommended, however, that at least one of the devices in accordance with the invention be used for every 100 square feet and preferably for every 80 square feet of surface the paintability of which is to be determined.

The indicator device in accordance with the invention is particularly useful in connection with concrete surfaces. Even relatively small amounts of moisture in these are highly detrimental to paint films by reason of the fact that the moisture carries with it lime constantly bring the same to the surface of the concrete through the capillary action thereof. The lime then exrcises a saponifying action upon the paint. When using a device in accordance with the invention this saponification problem can be substantially eliminated.

The foregoing description is for purposes of illustration and not of limitation and it is therefore my intention that the invention be limited only by the appended claims or their equivalents wherein I have endeavored to claim broadly all inherent novelty.

I claim:

1. Device for determining paintability of masonry surface which comprises a substantially transparent beaker having a contact-seal lip defining a ground substantially flat sealing surface for self-adhering said beaker to and with its open end against a masonry surface in sealing relation thereto and means carried by and inside said beaker for securing a moisture indicator of the color change indicator type.

2. Device according to claim 1 in which said indicator securing means comprises a hook carried by the beaker and a perforate basket suspended from said hook for holding moisture indicator material of the color indicator type.

LEO LIBERTHSON.

REFERENCES CITED

The following references are of record in the file of this patent:

UNITED STATES PATENTS

| Number | Name | Date |
|---|---|---|
| 456,498 | Perveil | July 21, 1891 |
| 1,014,842 | Muckenfuss | Jan. 16, 1912 |
| 1,103,985 | Murray et al. | July 21, 1914 |
| 1,627,883 | Blair | May 10, 1927 |
| 2,017,376 | Rother et al. | Oct. 15, 1935 |

FOREIGN PATENTS

| Number | Country | Date |
|---|---|---|
| 497,700 | Great Britain | Dec. 23, 1938 |